United States Patent [19]
Goldberg et al.

[11] Patent Number: 4,736,347
[45] Date of Patent: Apr. 5, 1988

[54] MULTIPLE STACKING AND SPATIAL MAPPING OF SEISMIC DATA

[76] Inventors: Bernard Goldberg, 3631 Woodvalley Dr., Houston, Tex. 77025; David A. Goldberg, 5419 Cheena, Houston, Tex. 77096

[21] Appl. No.: 7,490

[22] Filed: Jan. 28, 1987

Related U.S. Application Data

[63] Continuation-in-part of Ser. No. 611,597, May 18, 1984, abandoned.

[51] Int. Cl.$^4$ .......................... G01V 1/20; G01V 1/36
[52] U.S. Cl. ........................................ 367/46; 367/56; 367/53; 364/421
[58] Field of Search ....................... 367/45, 46, 53, 54, 367/56, 59, 73; 364/421

[56] References Cited

PUBLICATIONS

Gjoystdal et al, "Inversion of Reflection Times in Three Dimensions", Geophysics, vol. 46, #7, pp. 972–983, 7/81.
Gray et al, "Velocity Determination in a Complex Earth", 1983, SEG Convention, Las Vegas, Nev., pp. 1–17, plus figures.

Primary Examiner—Nelson Moskowitz
Attorney, Agent, or Firm—Robert M. Carwell

[57] ABSTRACT

Seismic traces are stacked in a plurality of orthogonal measures to form multiple stacked traces at a positive offset. The stacking process determines the apparent velocities as functions of the travel time at the positive offset. The interval acoustic velocity of the first layer is then determined from knowledge of surface topography, source-receiver offset, two-way travel times and the first reflector apparent velocities. The first layer velocity information enables the incident and emergent angles of the raypaths at the surface to be calculated, as well as enabling the dip angles and spatial coordinates of the reflection points on the first reflecting boundary to be determined.

Seismic data corresponding to the second reflecting boundary are then spatially mapped to the first reflecting boundary by ray tracing and by a new method for calculating the apparent velocities at the first boundary. The process is repeated for each succeedingly deeper boundary. The derived acoustic velocity model of the earth is displayed as a stacked seismic section in spatial coordinates. This process may be applied to obtain earth models and seismic sections in both two and three dimensions.

11 Claims, 7 Drawing Sheets

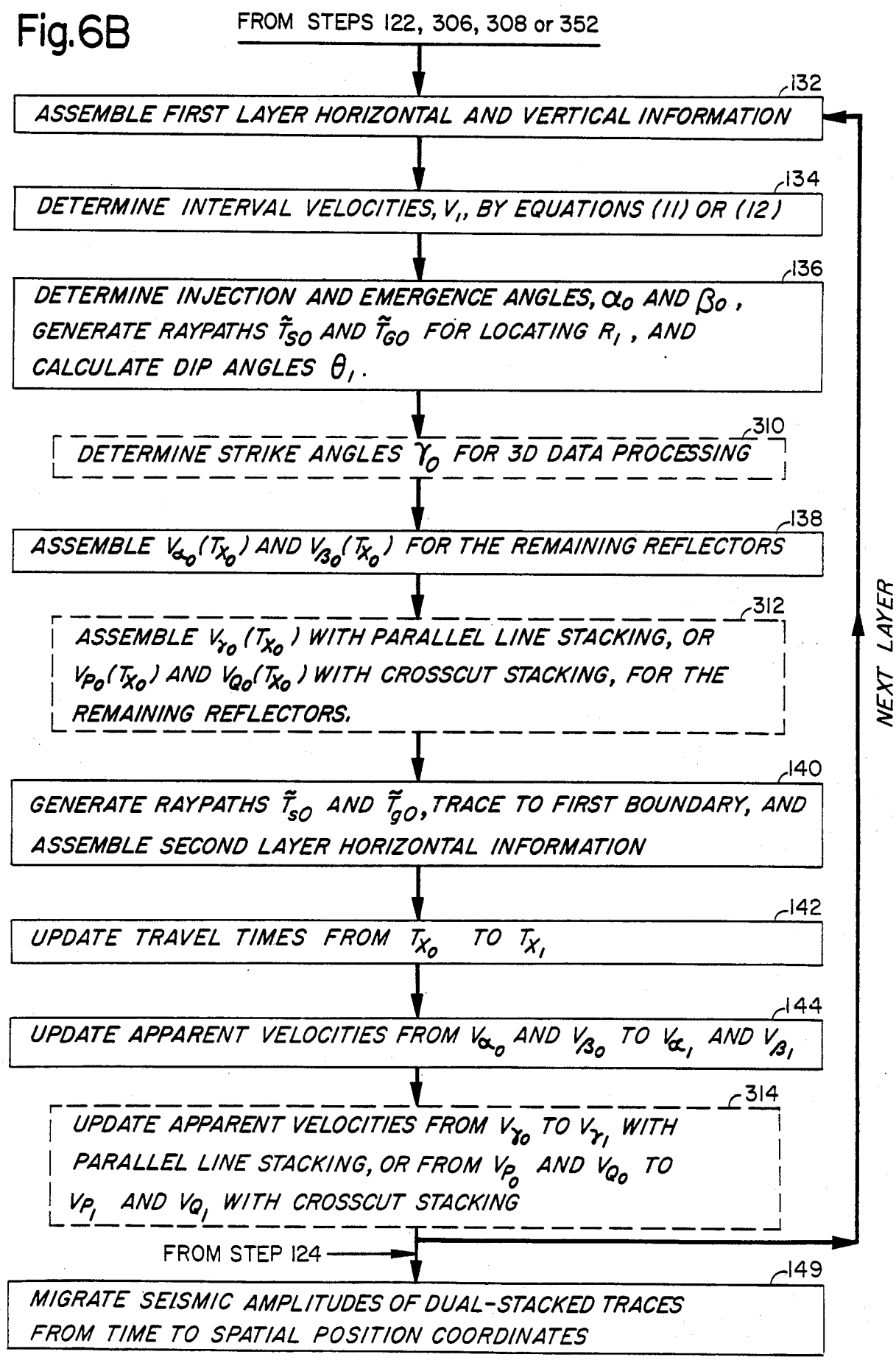

MULTIPLE STACKING AND SPATIAL MAPPING OF SEISMIC DATA

RELATED CASES

This application is a continuation-in-part of co-pending application Ser. No. 06/611597, filed May 18, 1984, entitled "Multiple Stacking and Spatial Mapping of Seismic Data" by Bernard Goldberg and David A. Goldberg, now abandoned.

BACKGROUND OF THE INVENTION

The field of this invention is seismic exploration.

The object of seismic exploration is to obtain an acoustic velocity model of the earth's subsurface from sources and receivers of acoustic energy at the earth's surface. Seismic reflections observed at the surface are generated from boundaries between strata of contrasting acoustic impedances. This invention is concerned with processing conventional seismic reflection observations into a spatial image of the earth consisting of the locations and shapes of the earth's reflecting boundaries and the acoustic velocities (also called 'interval velocities') of the layers between those reflecting boundaries.

The current method of processing seismic reflection data stems from a development of C. H. Dix (Geophysics, Vol. 20, pp. 68–86, 1955) which is based on an earth model consisting of flat layers, as in a cake, whose interval velocities are a function of depth only. Using this layercake earth model, Dix showed that when the offset between source and receiver was increased, the two-way acoustic travel times from source to receiver via the reflectors would increase approximately as two-parameter hyperbolas. The stacking velocity parameters of these hyperbolic moveout relationships between offsets and two-way travel times are directly related to the second derivatives of the hyperbolas at zero offset.

Dix also showed the stacking-velocity parameters were root-mean-square averages of the interval velocities of the layers weighted by their zero-offset travel times. This development provided a general method of inverting seismic data by extrapolation along hyperbolas to zero offset where the stacking velocity parameters could be estimated and inverted into a layercake model of the earth. Empirical verification of the estimated stacking velocity parameters is, however, very difficult, because seismic traces near zero offset are unavailable, and because empirical moveout curves deviate systematically from two-parameter hyperbolas fitted over the entire range of observed offsets. Also, land seismic data need to be refocussed to a flat surface to conform to layercake earth models.

Since Dix's contribution in 1955, seismologists have extended the application of his method of seismic inversion to earth with two- and three-dimensional dipping reflectors between which interval velocities could change laterally. They have also substantially increased multiple coverage of sources and receivers in seismic lines to obtain more reliable estimates of stacking-velocity parameters at zero offset.

Despite the extensions of Dix's method to more complex earth models and the increased multiple coverage of seismic data, current data processing of full-scale seismic data often results in velocity models of the earth which are grossly inaccurate. For this reason, an initial velocity model of the earth is first estimated on the basis of zero-offset seismic measurements. Forward modelling techniques such as raypath tracing and depth migration are then applied to the initial velocity model of the earth to calculate positive-offset travel times which can be compared to those of observed seismic data for possible validation or modification of the earth model.

More recent work has focussed on the use of non-zero-offset velocity measurements and travel times (Gray and Golden, 1983 Society of Exploration Geophysics Convention). The objective of this method was to reduce the error amplification of interval velocity estimates that result from the use of second derivatives at zero offset, embodied in stacking velocity estimates, as opposed to using estimates of first derivatives or slopes of the moveout curves at a nonzero-offset, often called time dips or apparent velocities.

In the work of Gray and Golden, apparent velocities were measured directly from common source and common receiver gathers over the entire range of offsets. This, however, was unsuccessful, for two reasons. Firstly, the measurement of apparent velocities directly from moveout curves of commmon source or receiver gathers is notoriously difficult and cumbersome, as a result of which the measurements were made very sparsely. Secondly, the apparent velocities estimated at a nonzero offset were inaccurate because the entire range of offsets was represented in their measurement, thereby averaging disparate apparent velocities at various offsets in the range. Owing to the sparseness and inaccuracy of the measurements, the inversion of observed seismic data was unsuccessful, as a consequence of which seismologists have abandoned this approach.

The point of departure of this invention from current seismic data processing stems for the poor approximations of two-parameter hyperbolas to the moveout curves of many seismic events over the entire range of offsets of the observed seismic data. For example, geologic anticlines often have elliptical moveout curves where travel times actually decrease as the offsets increase, resulting in imaginary stacking velocities. Consequently, the current practice of stacking such seismic data along two-parameter hyperbolas and extrapolating those results to zero offset eliminates information of many complex geologic structures which are of high interest in seismic exploration. Stacking velocities measured from nonhyperbolic moveout curves are inaccurate, and these errors are highly amplified in calculating interval velocities by Dix's method of seismic inversion. Moreover, unlike random errors, inaccuracies of stacking velocities measured from nonhyperbolic moveout curves are systematic errors which cannot be reduced by increasing multiple coverage of sources and receivers in a seismic line.

This invention teaches how velocity models of the earth can be constructed from observed seismic data by using instantaneous slopes of the moveout curves (called 'apparent velocities') measured over selected ranges of offsets. Nonhyperbolic moveout curves do not prevent apparent velocities from being measured with sufficient accuracy at the average offset of selected ranges of offsets. Moreover, the statistical reliability of measuring such apparent velocities improves as the multiple coverage of sources and receivers is increased. Lastly, the estimates of apparent velocities which are made in the manner of this invention can be empirically verified from the moveout curves of traces in the vicinity of the offset and datum point of the stacked average-offset trace.

The invention provides for apparent velocity measurements at the average offsets of different ranges of observed offsets along the moveout curves. Apparent velocities obtained from each range of offsets can be understood as independent data which travels through distinct regions of the earth with unique trajectories. Therefore, earth models derived from different ranges of offsets may be directly compared, and their congruence serves as a validation of the seismic inversion process. No such validation is possible for current seismic data processing systems because the stacking velocities which they measure are both defined by and dedicated to hyperbolic moveout curves over the entire range from zero offset to the maximum offset of the seismic data.

SUMMARY OF THE INVENTION

The present invention provides for inverse modeling of the earth from seismic reflection data by interpolating subsets of seismic trace information to average offsets, as opposed to the prior art of extrapolating entire sets of seismic trace information to zero offset. Seismic inversion by the invention enables the final earth model to be estimated directly from observed seismic data without using initial earth models on which forward modelling programs of the prior art must operate to obtain improved earth model estimates. The invention thereby increases the accuracy of the resulting earth model while eliminating the need for using time consuming and costly inverse and forward modelling iterations in order to obtain the final earth model.

With the present invention, conventional arrays of seismic energy sources and receivers are used to measure the response of the earth to impart seismic energy. The seismic traces are sorted into either common datum point (CDP) or common source point (CSP) gathers, and subsetted into bundles of traces from a number of different offset ranges. Stacking the traces to their average offset in each bundle yields a stacked trace with average source, receiver, and datum point locations as well as measurements of its offset-distance derivatives with respect to average-offset travel times, called the CCP or CSP apparent velocity functions of the stacked trace.

The stacked traces with a common average offset at neighboring datum points are then combined into common offset distance (COD) panels and stacked to common datum points. The second stacking procedure yields a dual stacked trace with average source, receiver, and datum point locations as well as measurements of its datum-distance derivatives with respect to average-offset travel times, called the COD apparent velocity functions of the stacked trace. The CDP or CSP apparent velocity functions of the stacked trace and its COD apparent velocity functions are then converted into mathematically equivalent apparent velocity functions of the stacked trace in the common source and common receiver panels.

At each datum point, information in the form of (a) positions and slopes of the surface at the source and receiver; (b) travel time; (c) offset distance; and (d) common source and receiver panel apparent velocities, obtained in the manner set forth above, allows determination according to the present invention of the interval acoustic velocity of the first layer, the coordinates of the reflection point, and the slope of the first boundary at the reflection point.

The same set of information components which were used to obtain the velocity model of the first layer and boundary are then used to solve for each succeeding layer and boundary. Thus, the incident and emergent angles for the raypath corresponding to the second reflector can be calculated from the apparent velocities measured at the surface and the interval velocity of the first layer. The raypaths from the source and receiver on the surface can then be traced to the new 'source' and 'receiver' positions on the first reflector. It is then possible to determine:

(a) the positions and slopes of the first reflector at the incident and emergent raypath intersections with this reflector;

(b) the offset distance between these intersection points on the first reflector;

(c) the travel time in the second layer which remains after subtracting the travel time for traversing the first layer from the total travel time; and (d) the apparent velocities at the source and receiver on the first reflector, which can be obtained from knowing the interval velocity of the first layer and the angle made by the incident and emergent raypaths with the first reflector.

Given now the boundary positions and slopes, offset, travel time and apparent velocity information at the first reflector, the interval velocity of the second layer and the spatial position and slope of the second reflector can be determined.

Solution of the characteristics of succeeding layers and boundaries is repeated until the data are exhausted. The interpreted seismic information can then be displayed as a velocity model of the earth and a depth migrated seismic section.

The dual stacking and spatial mapping process of the present invention described above assumes that the seismic raypaths are constrained within a vertical seismic plane, yielding a two-dimensional acoustic velocity model of the earth which can be displayed as a stacked section in the spatial coordinates of the seismic plane. In order to obtain a three-dimensional earth model and corresponding seismic sections, additional information must be obtained. If data are collected from independent parallel seismic lines, parallel lines stacking and spatial mapping may be performed. In this procedure, a third stacking step yields information about the lateral components of the seismic raypaths, assuming that the incident and emergent raypaths have the same lateral angles at the surface. If data are collected from both parallel seismic lines and intersecting seismic lines, or from two different sets of intersecting seismic lines, crosscut stacking steps allow the computation of possibly different lateral components of the incident and emergent raypaths. Both parallel line stacking and crosscut stacking are straightforward extensions of the process outlined for dual stacking, and use largely the same flow of information.

This invention draws its principal advantages from the use of multiple average offset analyses. This allows one to make use of both short and long offset data without assuming hyperbolic moveout over the entire range from zero offset to the maximum observed offset. Apparent velocities derived from large source-receiver offsets correctly represent the local slopes of empirical moveout curves without requiring any extrapolation to zero offset, thereby allowing the examination of structures which are highly affected by the inaccuracy of assuming hyperbolic moveout over a wide range of offsets. In addition, use of positive-offset stacking allows the solution of interval velocities and reflector locations and shapes through use of apparent velocities, corresponding to the first derivatives of coordinate value with respect to time. Since first-order approximations of seismic measurements are more accurate and less sensitive to error than second-order approximations of the same data, the resulting solutions of the earth model obtained from first derivatives are more accurate.

Also, unlike zero-offset stacking, the seismic data are analyzed in place by using the surface slopes and elevations of sources and receivers without refocussing them to a flat surface, and by following the raypaths from actual source and receiver locations through which the seismic waves travel. Thus, the raypaths of positive-offset stacked traces represent observed seismic data more closely than zero-offset stacked traces, whose raypaths from coincident source and receiver locations traverse different sections of the earth than observed seismic data.

This invention displays many advantages compared with other attempts at nonzero-offset earth model construction. In particular, this invention allows various gathers in orthogonal coordinates to be used, as opposed to using only common source and common receiver gathers. In particular, the method of the invention allows the use of common depth point and common average-offset distance gathers of traces, which are much better behaved than common source and common receiver gathers. Furthermore, the use of multiple stacking, whereby stacked traces are further stacked, gives an additional step of enhancing signal relative to noise. Finally, the use of multiple offset ranges settles the otherwise conflicting interests in using the full range of data offsets as opposed to the need for limiting the offset range in order to avoid systematic errors in the representation of empirical moveout curves. Thus, the invention encourages the use of small offset ranges where apparent velocity functions are well defined and accurately measurable.

BRIEF DESCRIPTION OF THE DRAWINGS

FIGS. 6A and 6B are flow charts illustrating the operation of a computer performing computations in multiple stacking and spatial mapping according to the present invention.

DESCRIPTION OF ONE PREFERRED EMBODIMENT OF THE INVENTION

I. Multiple Stacking

At the outset, it is helpful to compare stacking in the prior art with the present invention, which will be referred to as zero offset and positive offset stacking, respectively. In both methods, recordings are made of seismic energy separately imparted to the earth at a plurality of sources and sensed at a plurality of receivers. With two-dimensional seismic data, the sources and receivers, also known as shot and geophone, respectively, are distributed along the surface in an approximately linear array, called the seismic line. The analog recordings of each trace are digitized, filtered, static corrected, and deconvolved, all in accordance with conventional data processing.

Figure 1:
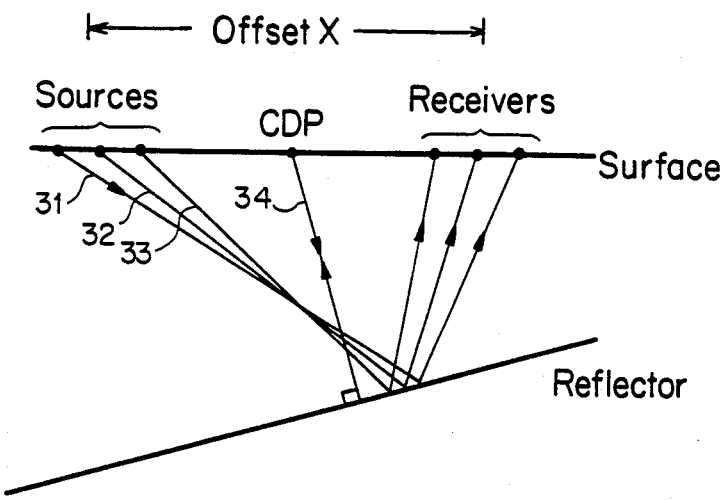
FIG. 1 is a cross-sectional schematic view of the earth displaying travel between the surface and a reflecting boundary of seismic raypaths.

A panel of traces sharing a common midpoint, also known as common datum point (CDP), is illustrated in FIG. 1. Raypaths are shown of three positive offset traces 31, 32, and 33, emanating from their respective sources, traveling to the first reflector, and back to the receivers. In the zero offset stacking process, the travel times of the reflections from an event are fitted to a two-parameter moveout hyperbola $$T_x^2 = T_o^2 + X^2/V_s^2 \qquad (1)$$

where $T_x$ is the observed travel time and X is the known offset distance between the source and receiver. The fitted parameters $T_o$ and $V_s$ are called the zero offset travel time and stacking velocity, respectively. The $T_o$ parameter represents the two-way travel time of a raypath 34 generated by a coincident source and receiver (zero offset) at the common depth point. The $V_s$ parameter represents the effective velocity of the seismic wave traveling along the zero offset raypath. U.S. Pat. No. 3,417,370 describes a typical way in which the zero offset stacking procedure is performed.

In the present invention, the three raypaths 31, 32, and 33 are interpolated by positive offset stacking to a raypath approximately equal to raypath 32. Data are stacked according to a two parameter moveout hyperbola $$T_x^2 = T_{xo}^2 + (X^2 - X_o^2)/V_s^2 \qquad (2)$$

where $X_o$ refers to the positive offset of a reference raypath (e.g. raypath 32). For convenience and accuracy, $X_o$ may refer to the mean or root-mean-square offset of the bundle of traces that are being stacked, even if that measure is not an offset of a trace in the data set. Hereinafter, the value $X_o$ will be referred to as the average offset distance, and the trace formed by positive offset stacking will be denoted as the average-offset trace whose estimated travel time is $T_{xo}$. Similar to the manner described in the U.S. Pat. No. 3,417,370, for a given value of $T_{xo}$, different trial values of the average-offset stacking velocity $V_s$ are used to define a set of moveout hyperbolas according to equation (2). The seismic amplitudes along each moveout hyperbola are correlated and $V_s$ is selected according to the moveout hyperbola which affords the highest correlation. Then the value of $T_{xo}$ is incremented, and the process of determining $V_s$ is repeated. The resulting values of $V_s$ constitute a stacking velocity function of the average-offset travel times $T_{xo}$. The seismic amplitudes of the individual traces may then be stacked to the average offset along hyperbolic moveout curves defined by the stacking velocity function.

At any given offset, the slope $dX/dT$ of a CDP moveout hyperbola represents the rate at which the wavefront from a seismic event could be observed to cross the surface. For this reason, the slope $dX/dT$ is called the CDP apparent velocity of the seismic event, which is denoted by $V_m$, at the average offset.

$$dX/dT = V_m = V_s^2 T_{xo}/X_o \qquad (3)$$

Applying this formula, $V_m$ can be determined as a function of $T_{xo}$ for the average-offset $X_o$.

The stacked traces with neighboring CDPs are then formed into a panel of traces with common average offset. These traces are stacked according to the linear moveout equation $$T_x = T_{xo} + (CDP - CDP_o)/V_o \qquad (4)$$

where $V_o$ is the slope, or apparent velocity, of the moveout curve of an event in the common offset distance (COD) panel, and $CDP_o$ is the CDP of the reference trace under consideration. Similar to the determination of $V_m$, different trial values of $V_o$ are used with a given value of $T_{xo}$ to define a set of moveout curves. On each moveout curve, the seismic amplitudes of the average-offset stacked traces are correlated, and $V_o$ is selected according to the moveout curve which affords the highest correlation.

The output of this second stacking step is a dual stacked trace as well as values of $V_o$ as a function of $T_{xo}$. Dual stacking in the manner set forth above also provides the ancillary benefit of two separate steps of noise-reduction.

Figure 2A:
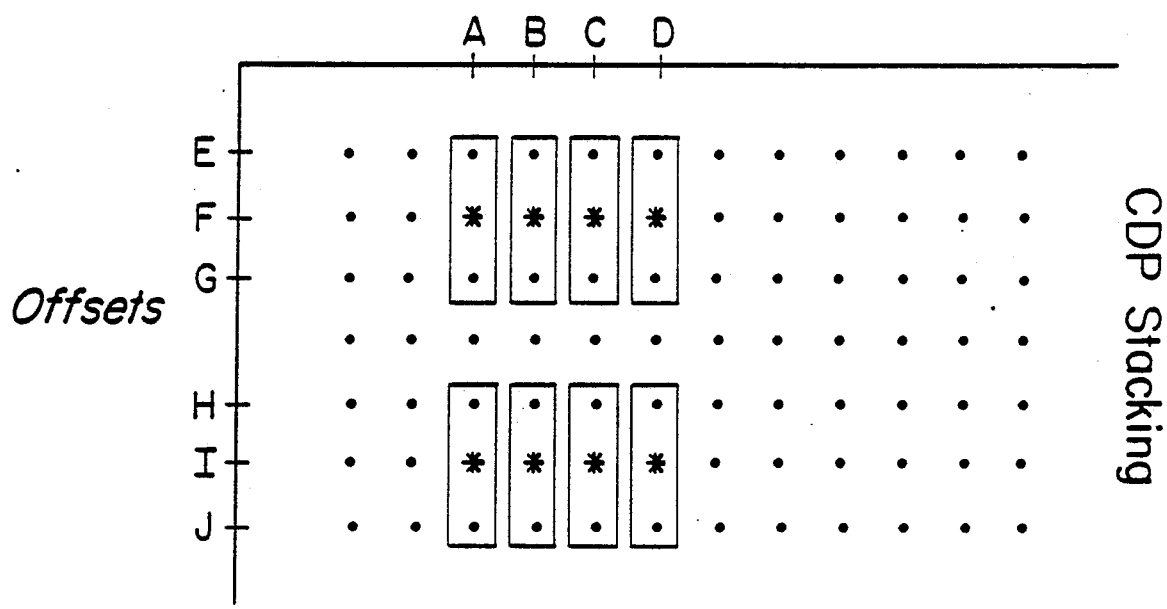
FIGS. 2A and 2B are diagrams of source-receiver offset and CDP coordinates of traces utilized in the stacking process of the present invention.

FIG. 2A illustrates an array of traces, each denoted by a dot or asterisk, displayed according to their CDP position and offset distance X. A trace Tr at CDP coordinate A and offset coordinate E is denoted $Tr_{AE}$. Each vertical rectangle delineates a bundle of traces for CDP stacking. Thus, traces $Tr_{AE}$, $Tr_{AF}$ and $Tr_{AG}$ are processed to form a stacked trace $Tr_{AF}$ at CDP coordinate A. A sufficient number of traces per bundle must be specified in order to obtain an acceptable statistical reliability of $T_{xo}$ and $V_s$ estimates.

As shown in FIG. 2A, two sets of offsets could be separately stacked at CDP A, resulting in stacked traces $Tr_{AF}$ and $Tr_{AI}$. In general, the average offset $X_o$ should be increased when $T_{xo}$ becomes larger in order to obtain more accurate $T_{xo}$ and $V_s$ estimates for deeper formations.

Figure 2B:
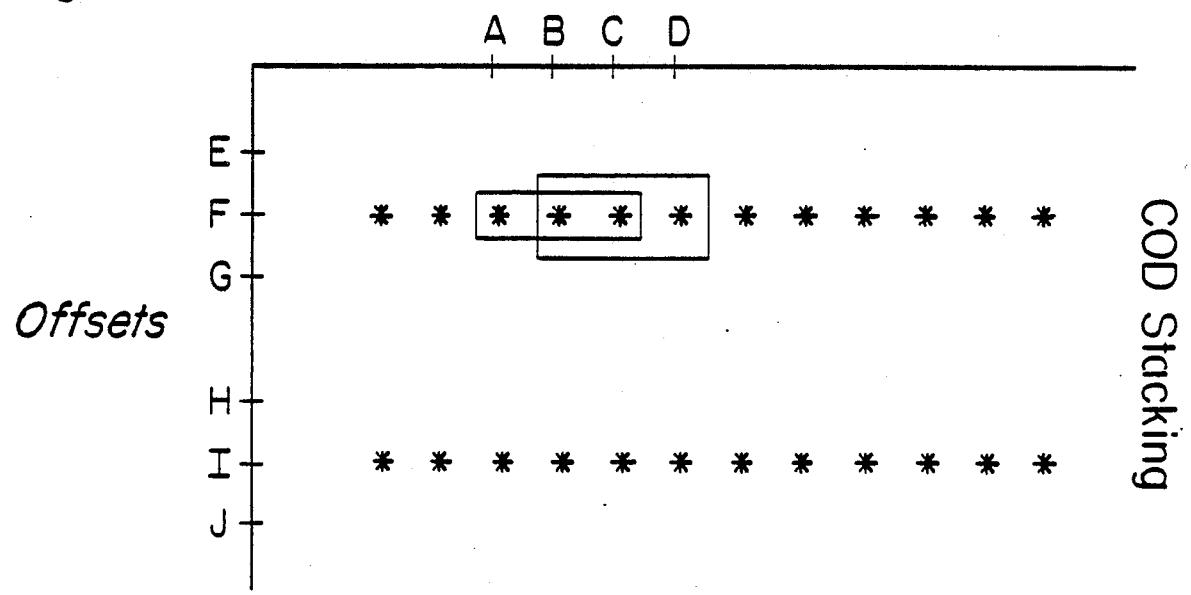

The output of CDP stacking is a panel of stacked traces located at offset coordinates F and I denoted by asterisks in FIG. 2A. The reduced number of traces that must be handled in the second stacking step is illustrated in FIG. 2B. In FIG. 2B, common depth points and offset distances to those of FIG. 2A are commonly designated. Traces $Tr_{AF}$, $Tr_{BF}$ and $Tr_{CF}$ are stacked again to the datum coordinate B, thereby yielding the dual-stacked trace $Tr_{BF}$. Then, traces $Tr_{BF}$, $Tr_{CF}$, and $Tr_{DF}$ are stacked to the datum coordinate C, thereby yielding the dual-stacked trace $Tr_{CF}$. This process is repeated to give an array of dual-stacked traces at the average offsets of F and I shown in FIG. 2B.

It should be understood that the order in which the stacking steps are performed can be reversed. Thus, COD stacking may be performed prior to CDP stacking, yielding substantially equivalent results. In addition, trial apparent velocities $V_m$ may be used in place of trial stacking velocities $V_s$, in order to obtain $V_m$ estimates directly. These and similar alterations are to be construed as within the scope of this invention.

The apparent velocities $V_m$ and $V_o$ are related to the source and receiver apparent velocities $V_\alpha$ and $V_\beta$, as follows:

$$\frac{1}{V_\alpha} = \frac{1}{V_m} + \frac{1}{2V_o} \qquad (5)$$

$$\frac{1}{V_\beta} = -\frac{1}{V_m} + \frac{1}{2V_o} \qquad (6)$$

Apparent velocity $V_\alpha$ is the rate at which the wavefront crosses the surface at the source when the receiver position is fixed; apparent velocity $V_\beta$ is the rate at which the wavefront crosses the surface at the receiver when the source position is fixed.

It is understood that for determining source and receiver apparent velocities $V_\alpha$ and $V_\beta$, methods of data collection and stacking other than described above may be performed, provided that the apparent velocities measured in the panels used can be resolved into $V_\alpha$ and $V_\beta$ components along the seismic line, as in equations (5) and (6). This proviso covers the use of any roughly linear array of sources and receivers on the surface, including crooked or curved seismic lines.

II. SPATIAL MAPPING

Figure 3:
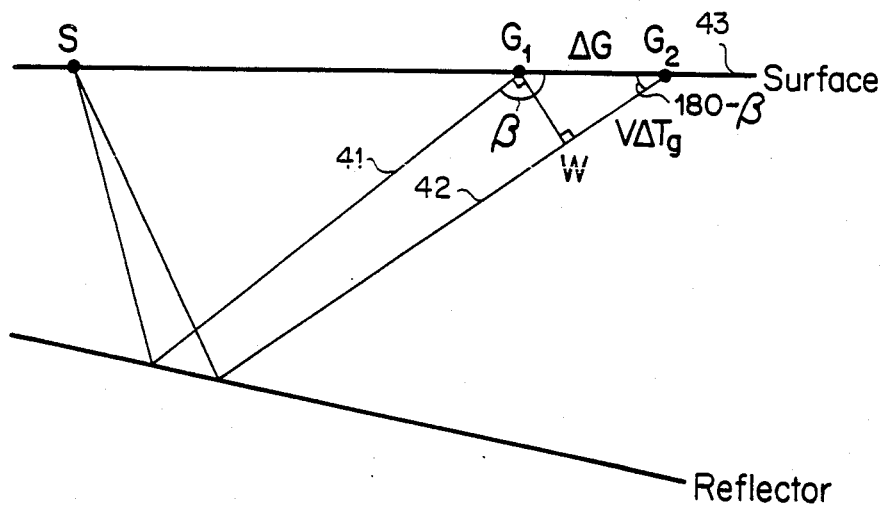
FIG. 3 is a cross-sectional schematic view of the earth displaying travel between the surface and a reflecting boundary of seismic raypaths for the purpose of defining the apparent acoustic velocity at the receiver position.

The usefulness of $V_\alpha$ and $V_\beta$ measurements occurs in connection with the determination of incident and emergent raypath angles as illustrated in FIG. 3. For a fixed source with two receivers at positions $G_1$ and $G_2$, differing by distance $\Delta G$, the travel time increases from T in raypath 41 to $T + \Delta T_g$ in raypath 42. In the figure, the wavefront is denoted by line GW, which intersects surface 43 with apparent velocity $V_\beta$ in time interval $\Delta T_g$ (i.e. $\Delta G = V_\beta \Delta T_g$). The increase in travel distance of raypath 42 is $V \Delta T_g$, where V is the interval acoustic velocity of the medium. The emergent raypath angle $\beta$, depicted in the figure and defined below, is measured with respect to the positive direction of surface 43 at receiver position G. From triangle $G_1WG_2$, the expression can be obtained:

$$\cos(180 - \beta) = -\cos \beta = \frac{V \Delta T_g}{\Delta G} = \frac{V}{\Delta G/\Delta T_g} = \frac{V}{V_\beta} \qquad (7)$$

A similar equation relates the incident raypath angle $\alpha$, the interval velocity V, and the apparent velocity $V_\alpha$ $$\cos \alpha = \frac{V \Delta T_s}{-\Delta S} = \frac{V}{-\Delta S/\Delta T_s} = \frac{V}{-V_\alpha} \qquad (8)$$

Figure 4:
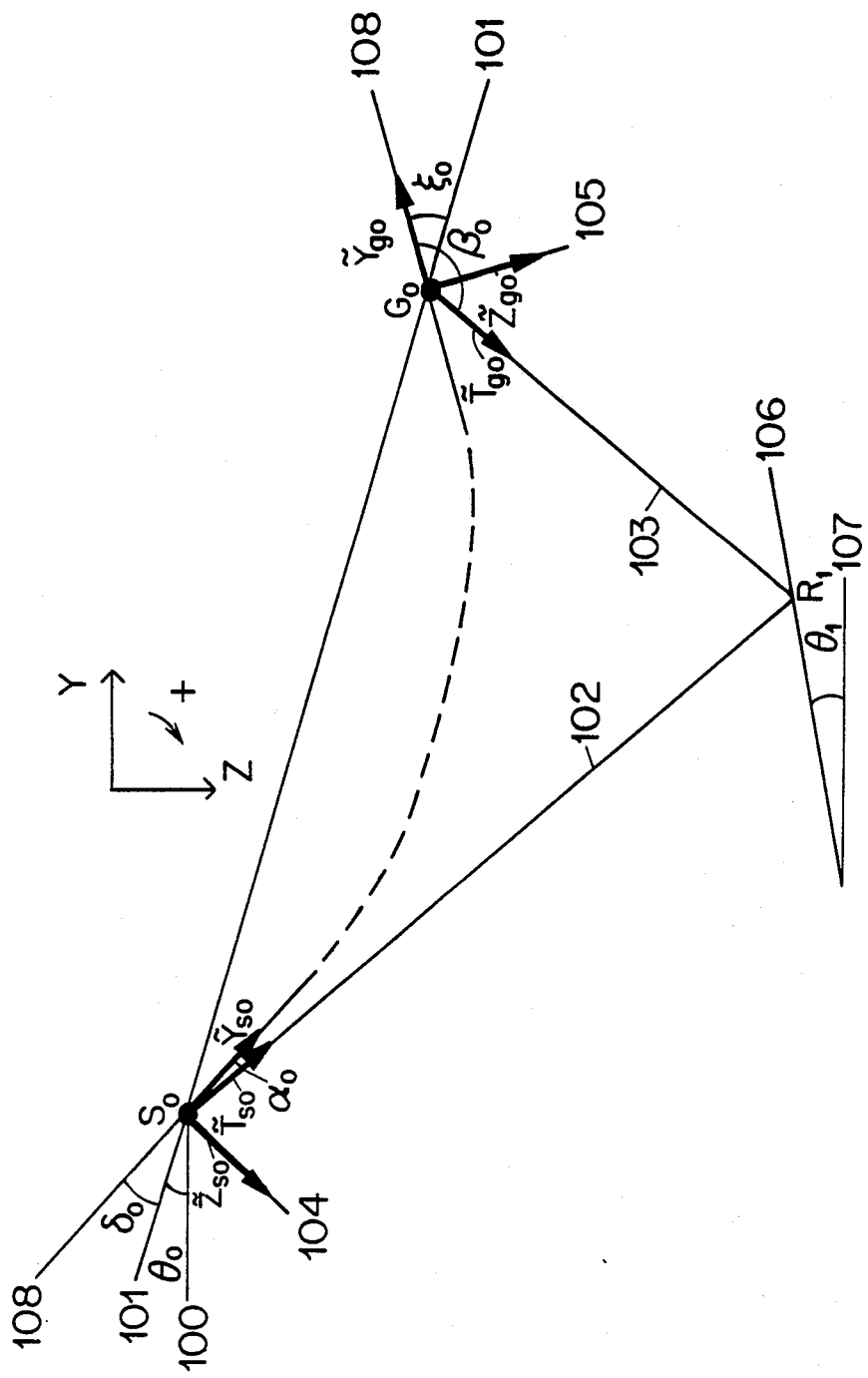
FIG 4. 4 is a cross-sectional schematic view of the earth displaying travel between a synclinal surface and a local straight-line reflector of a seismic raypath illustrating the sign conventions used in one embodiment of the present invention.

A system of rectangular axes, designations and sign conventions is used to describe raypaths and boundaries as shown in FIG. 4. A horizontal axis Y is defined as positive in the direction from source to receiver (left to right). A vertical axis Z is defined as positive in the direction of increasing depth. A right-handed system of axes is used to define a positive sense of rotation through 90 degrees which brings the positive Y axis into the position of the positive Z axis.

The surface is considered as the 0th boundary. The $i^{th}$ layer which rests on the $i^{th}$ boundary has an interval velocity, $V_i$, that is always considered as positive. Angles, apparent velocities, and other quantities measured at the $i^{th}$ boundary are denoted by the subscript 'i'.

At $S_o$ and $G_o$, unit Y vectors are located along the tangents to the surface and pointed in the direction of the positive horizontal axis. In the figure, the $\widetilde{Y}$ vectors are depicted by bold arrows which are labeled $\widetilde{Y}_{so}$ and $\widetilde{Y}_{go}$ at $S_o$ and $G_o$, respectively. Unit Z vectors are drawn normal to the Y vectors at $S_o$ and $G_o$, and are denoted by bold arrows $\widetilde{Z}_{so}$ and $\widetilde{Z}_{go}$ which are pointed in the positive Z direction. The incident and emergent raypaths are denoted by the unit vectors $\widetilde{T}_{so}$ and $\widetilde{T}_{go}$, respectively, drawn as bold arrows. The directions of $\widetilde{T}_{so}$ and $\widetilde{T}_{go}$ are chosen so that their Z component is positive (pointing downwards). The raypath angles $\alpha$ and $\beta$ are described by the right-handed system of rotation from $\widetilde{Y}_{so}$ and $\widetilde{Y}_{go}$ to $\widetilde{T}_{so}$ and $\widetilde{T}_{go}$, respectively, which may have values between 0 and 180 degrees.

Using vector notation, the apparent velocities are simply determined by $$V_{\alpha o} = \frac{-V_1}{\widetilde{Y}_{so} * \widetilde{T}_{so}} = \frac{-V_1}{\cos \alpha_o} \qquad (9)$$

and $$V_{\beta o} = \frac{-V_1}{\widetilde{Y}_{go} * \widetilde{T}_{go}} = \frac{-V_1}{\cos \beta_o} \qquad (10)$$

where '*' denotes the scalar product between flanking vectors. Ordinarily, with moderately dipping events and surfaces, $V_{\alpha o}$ is negative and $V_{\beta o}$ is positive. With steeply dipping events and surfaces, it is possible for $V_{\alpha o}$ and $V_{\beta o}$ to be both positive or both negative.

In FIG. 4, lines 100 and 107 represent horizontal lines from which the dip angles of straight lines 101 and 106, respectively, can be measured. The dip angle theta is defined to be positive when the shortest rotation of the horizontal line which makes it coincide with the straight line is positive. Otherwise, the dip angle $\theta$ is defined to be negative. Thus, the angle $\theta_o$ from line 100 to line 101 is positive, and the dip angle $\theta_1$ from line 107 to line 106 is negative.

At $S_o$ and $G_o$, straight line 101 forms two distinct surface angles $\delta_o$ and $\xi_o$ relative to curvilinear surface 108. The surface angle is defined to be positive when the shortest rotation of straight line 101 which makes it coincide with curvilinear surface 108 is positive. Otherwise, the surface angle is defined as negative. Thus, surface angle $\delta_o$ from line 101 to line 108 at $S_o$ is positive, and surface angle $\xi_o$ from line 101 to line 108 at $G_o$ is negative.

From offset $X_o$, travel time $T_{xo}$, and apparent velocities $V_{\alpha o}$ and $V_{\beta o}$, the interval velocity $V_1$ of the first layer may be determined using equation (11) below:

$$V_1^2 = \frac{X_o^2(V_{\beta o} - V_{\alpha o}) + 2X_o T_{xo} V_{\alpha o} V_{\beta o}}{2X_o T_{xo} - T_{xo}^2(V_{\beta o} - V_{\alpha o})} \qquad (11)$$

Equation (11) assumes that surface 108 coincides with straight line 101, making $\delta_o = \xi_o = 0$. More generally, from measured offset $X_o$, travel time $T_{xo}$, apparent velocities $V_{\alpha o}$ and $V_{\beta o}$, and surface angles $\xi_o$ and $\delta_o$, the interval velocity $V_1$ can be determined with equation (12) below which can be solved using numerical methods.

$$\frac{V_1^2 + M^2}{2MV_1} = \frac{V_{\alpha o} V_{\beta o} - B(V_1)A(V_1)}{V_{\alpha o}B(V_1) - V_{\beta o}A(V_1)} ; \qquad (12)$$

where $M = X_o/T_{xo}$ $B(V_1) = V_1 \cos \xi_o + \sin \xi_o \{V_{\beta o}^2 - V_1^2\}^{\frac{1}{2}}$ $A(V_1) = V_1 \cos \delta_o + \sin \delta_o \{V_{\alpha o}^2 - V_1^2\}^{\frac{1}{2}}$ Alternatively, the estimation of $V_1$ from equation (12) can be numerically approximated with equation (11) by the known method of the rule of false position.

Equations (11) or (12) can be slightly modified to include apparent velocities other than the source and receiver velocities. Thus, substitution of equations (5) and (6) into (11) or (12) yields new equations giving the interval velocity as a direct function of the CDP and COD apparent velocities.

After the interval velocity $V_1$ has been determined from equations (11) or (12), angles $\alpha_o$ and $\beta_o$ can be determined from the inverse relationships of equations (9) and (10).

$\alpha_o = \arccos(-V_1/V_{\alpha o})$ (13)

$\beta_o = \arccos(-V_1/V_{\beta o})$ (14)

where $\alpha_o$ and $\beta_o$ can take values between 0 and 180 degrees. Then, the dip angle $\theta_1$ of the reflector at reflection point R can be determined by equation (15)

$\theta_1 = (\beta_o + \xi_o + \alpha_o + \delta_o)/2 + \theta_o - 90°$ (15)

Finally, the coordinates of reflection point R may be solved by reconstructing the incident and emergent raypaths according to equations $\widetilde{T}_{so} = \widetilde{Y}_{so} \cos \alpha_o + \widetilde{Z}_{so} \sin \alpha_o$ (16)

$\widetilde{T}_{go} = \widetilde{Y}_{go} \cos \beta_o + \widetilde{Z}_{go} \sin \beta_o$ (17)

and then determining the coordinates of the intersection of vectors $\widetilde{T}_{so}$ and $\widetilde{T}_{go}$ at R to complete the acoustic velocity model of the first subsurface layer and boundary in spatial coordinates.

The process of determining the characteristics of subsurface layers and boundaries from input data in the form of offset, travel time, apparent velocities, and surface slopes is called 'spatial mapping.' While the offset distance SG and surface angles $\xi_o$ and $\delta_o$ can be calculated from field records, the travel time and apparent velocities must be determined by dual stacking as described above. After the first layer is spatially mapped, a stripping technique is used to determine the characteristics of lower layers and reflectors.

Figure 5:
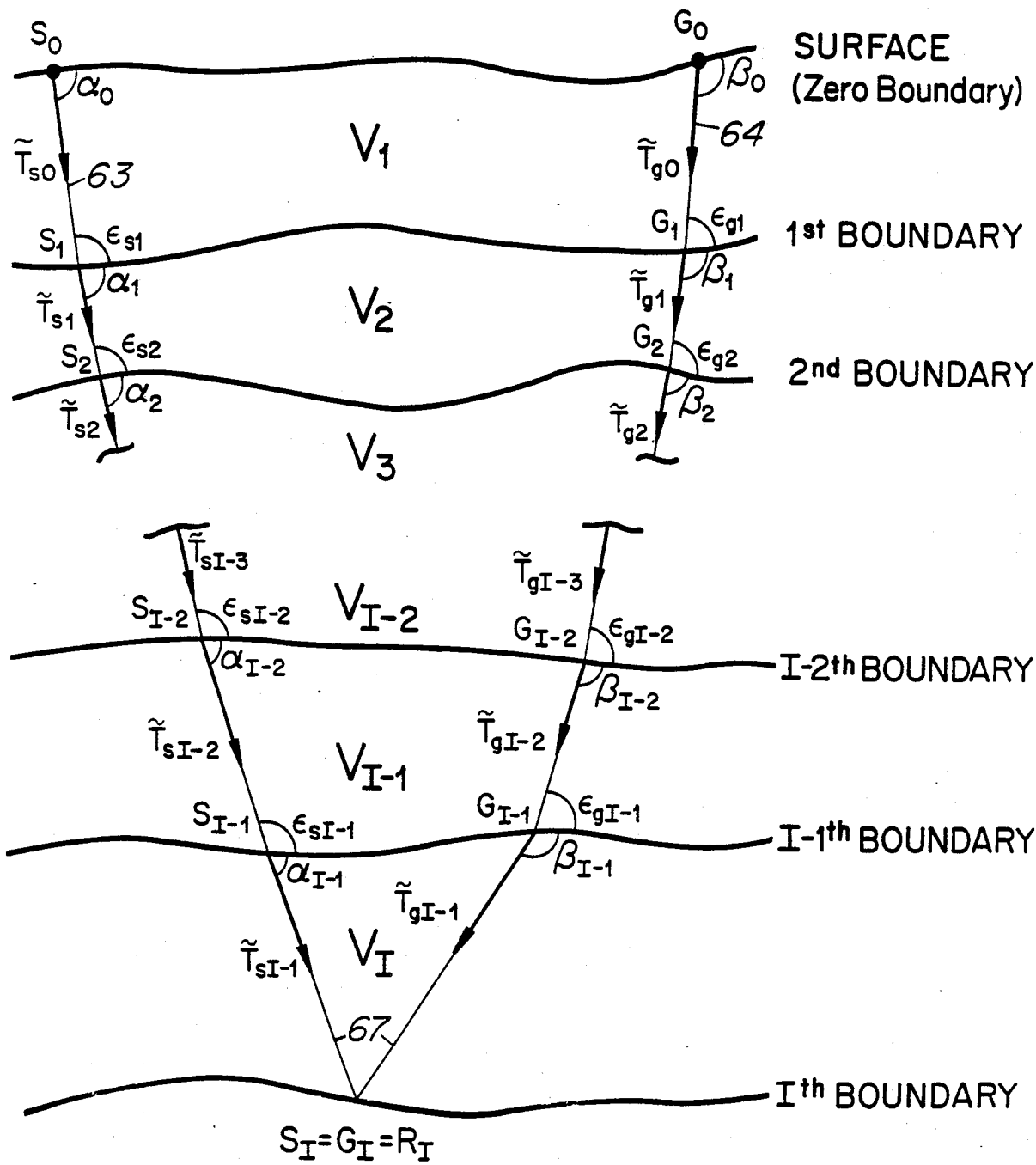
FIG. 5 is a cross-sectional schematic view of the earth displaying travel through reflecting boundaries of seismic raypaths illustrating the definitions used in one embodiment of the present invention.

FIG. 5 illustrates the manner in which information observed at the surface is spatially mapped to the $I^{th}$ reflecting boundary. The process begins with measurements of $S_o$ and $G_o$ coordinates, and angles $\xi_o$ and $\delta_o$ at the surface. The travel time $T_{xo}$ and apparent velocities $V_{\alpha o}$ and $V_{\beta o}$ pertaining to reflections from the $I^{th}$ boundary are determined by dual stacking. After determining first layer interval velocity $V_1$, equations (13) and (14) are used to calculate the incident and emergent raypath angles $\alpha_o$ and $\beta_o$ and equations (16) and (17) are used to construct the raypath vectors $\bar{T}_{so}$ and $\bar{T}_{go}$ at $S_o$ and $G_o$.

By standard raypath tracing (e.g. Shah, P.M., Geophysics, v. 38, pp. 600–604), the incident and emergent raypaths 63 and 64 are followed until their intersections with the I-1$^{th}$ reflecting boundary at $S_{I-1}$ and $G_{I-1}$. The new offset distance $S_{I-1}G_{I-1}$ is calculated, and the dip angles $\xi_{I-1}$ and $\delta_{I-1}$ of the I-1$^{th}$ boundary are determined. The travel time $T_{xI-1}$ in the $I^{th}$ layer is determined by subtracting from $T_{xo}$ the time spent in the first through the I-1$^{th}$ layer. Finally, the apparent velocities are determined at the I-1$^{th}$ reflector according to the equations $$V_{\alpha I-1} = \frac{V_{I-1}}{\cos \epsilon_{sI-2}} = \frac{V_{I-1}}{\bar{T}_{sI-2} * \bar{Y}_{sI-1}} \quad (18)$$

and $$V_{\beta I-1} = \frac{V_{I-1}}{\cos \epsilon_{gI-2}} = \frac{V_{I-1}}{\bar{T}_{gI-2} * \bar{Y}_{gI-1}} \quad (19)$$

where angle $\epsilon_{sI-2}$ is included between vectors $\bar{T}_{sI-2}$ and $\bar{Y}_{sI-1}$ and angle $\epsilon_{gI-2}$ is included between vectors $\bar{T}_{gI-2}$ and $\bar{Y}_{gI-1}$.

Given now the offset $S_{I-1}G_{I-1}$, travel time $T_{xI-1}$, apparent velocities $V_{\alpha I-1}$ and $V_{\beta I-1}$, and angles $\xi_{I-1}$ and $\delta_{I-1}$, pertaining to raypath 67 as it travels through the $I^{th}$ layer, equations (11) or (12) can be used to determine $V_I$. Next, equations (13) and (14) can be used to determine $\alpha_{I-1}$ and $\beta_{I-1}$, equation (15) can be used to determine $\theta_I$, and equations (16) and (17) can be used to determine the coordinates of $R_I$ from the intersection of vectors $\bar{T}_{sI-1}$ and $\bar{T}_{gI-1}$. Spatial mapping is repeated in this manner until the data are exhausted.

The final velocity model of the earth can be displayed in a variety of formats. In one such format, the velocity model is displayed in spatial coordinates in the absence of seismic trace information. In a typical format of seismic exploration, amplitudes from dually-stacked seismic traces are mapped to the spatial coordinates of the reflection points. Acoustic velocities can be superimposed on this depth-migrated seismic section through use of numbers, shadings, colors or other markings. The depth migrated seismic section could also be produced from the final velocity models by convolution with seismic wavelets.

III. Computer Implementation

A. Two Dimensional Data

Figure 6A:
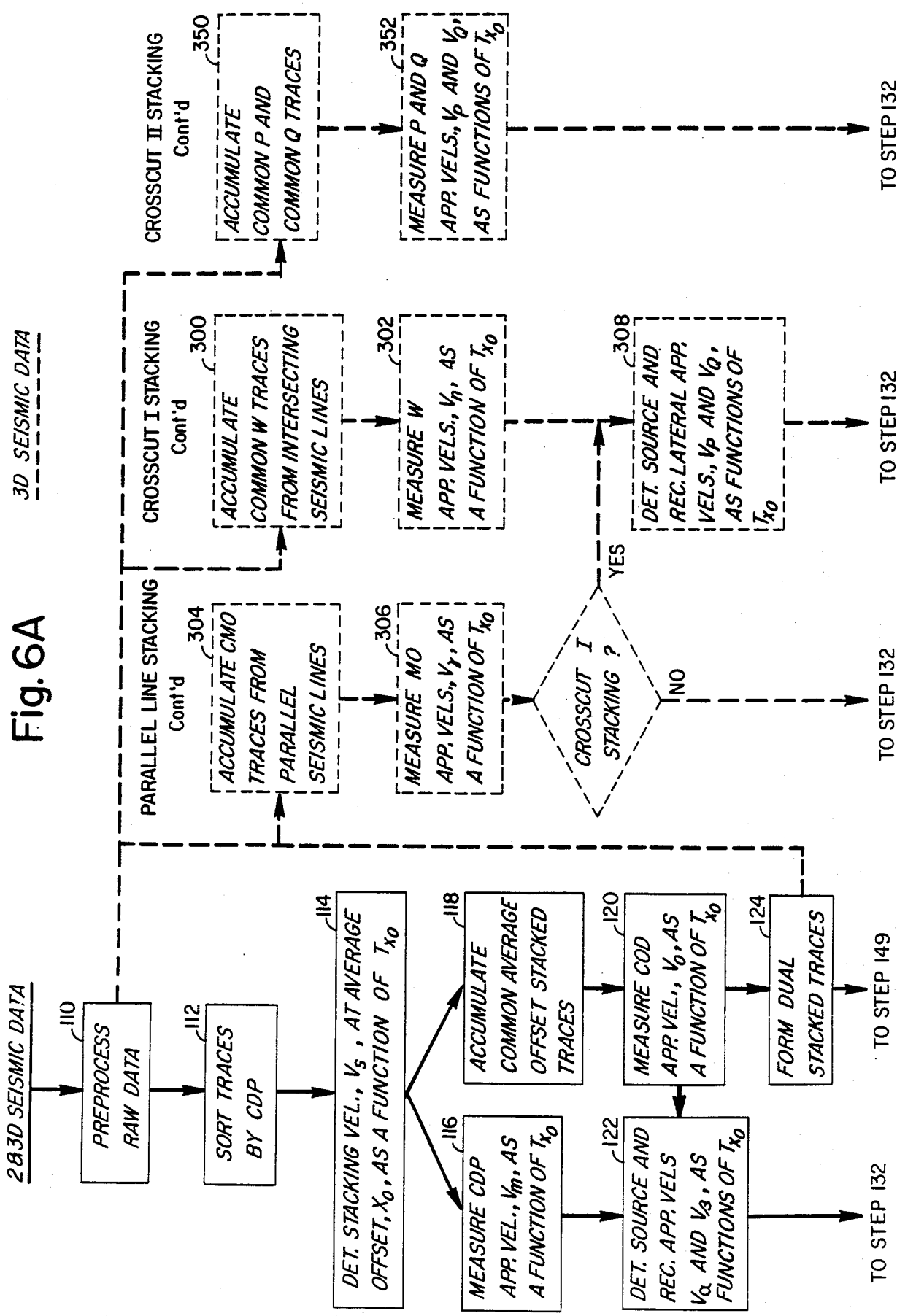

Turning to FIGS. 6A and 6B, flow charts are set forth of the preferred computer implementation of processing field-obtained traces according to the present invention. These flow charts provide adequate information to enable a competent programmer in the geophysical or seismic data processing industry to program a computer to practice the data processing steps of the present invention.

The elements of FIG. 6A in solid rectangular outlines describe the flow of information in multiple stacking for two-dimensional seismic data. First, raw seismic traces are preprocessed in step 110 by conventional techniques of digital filtering, wavelet processing, signal enhancement and static corrections. The pre-processed traces are sorted into CDP panels in step 112, where $X_o$ is selected, the coordinates $S_o$ and $G_o$ are determined, and surface angles $\delta_o$ and $\xi_o$ are calculated from header information. Multiple stacking is initiated in step 114 by measuring stacking velocities $V_s$ at the average-offset $X_o$, as a function of travel times $T_{xo}$. The measured stacking velocity function $V_s(T_{xo})$ enables stacking of the bundle of traces in each CDP panel. In step 116, the measured stacking velocity function $V_s(T_{xo})$ is used to calculate the CDP apparent velocity function $V_m(T_{xo})$ by means of equation (3).

In step 118, stacked traces of adjacent CDP panels are accumulated into common average-offset distance panels. In step 120, the apparent velocities $V_o$ of each COD panel are determined as a function of travel times $T_{xo}$. From $V_o(T_{xo})$ of step 120 and $V_m(T_{xo})$ of step 116, the source and receiver apparent velocities $V_{\alpha o}$ and $V_{\beta o}$, respectively, are calculated as functions of $T_{xo}$ by means of equations (5) and (6) in step 122. Also, using $V_o(T_{xo})$ and equation (4), dually stacked traces are formed from the stacked traces of the COD panels in step 124.

In summary, multiple stacking organizes seismic information into 'horizontal' and 'vertical' components. Horizontal information describes the position and shape of the boundaries. For example, the horizontal information at the top of the first layer includes the quantities $X_o$, $S_o$, $G_o$, $\delta_o$, $\xi_o$ which are calculated from the header information for the datum points along the seismic line. Vertical information consists of the seismic raypath directions embodied in the apparent velocities $V_\alpha(T_{xo})$ and $V_\beta(T_{xo})$ which are related to the incident and emergent raypath angles $\alpha$ and $\beta$ through equations (9) and (10). At the surface, the vertical information takes the form of $V_{\alpha o}(T_{xo})$ and $V_{\beta o}(T_{xo})$.

Assuming layers whose interval velocities change only at layer boundaries, both $V_{\alpha o}$ and $V_{\beta o}$ will also be constants which change only when new seismic events appear. Consequently, $V_{\alpha o}(T_{xo})$ and $V_{\beta o}(T_{xo})$ could be simplified into discrete steps which occur at travel times $T_{xo}$ which correspond to the onsets of new seismic events.

The process steps of FIG. 6B in solid rectangular outline describe the flow of information in spatial mapping for two-dimensional seismic data. Spatial mapping first utilizes the portion of $V_{\alpha o}(T_{xo})$ and $V_{\beta o}(T_{xo})$ that pertains to the first layer only, which is assembled in step 132 of FIG. 6B. The data of step 132 are operated on by equations (11) or (12) of step 134 to determine the interval velocities $V_1$ of the first layer. In step 136, equations (13)–(17) are used at each reflection point $R_1$ to determine the dip angle $\theta_1$ of the first reflecting surface and its spatial coordinates.

The $V_{\alpha o}(T_{xo})$ and $V_{\beta o}(T_{xo})$ information is assembled for the remaining reflectors in step 138. The first layer incident and emergent raypath vectors $\bar{T}_{so}$ and $\bar{T}_{go}$ are then generated in step 140 for the remaining reflectors with equations (13), (14), (16) and (17). By raypath tracing from $S_o$ and $G_o$, the horizontal information of $X_1$, $S_1$, $G_1$, $\delta_1$ and $\xi_1$ at the first reflecting boundary can be calculated for each of the remaining reflectors.

The travel times from $S_o$ to $S_1$ and $G_o$ to $G_1$ are now computed in step 142, and then subtracted from $T_{xo}$. This gives the travel times $T_{x1}$ that are required in going from $S_1$ and $G_1$ on the first reflector to the reflection points on each of the remaining reflectors. The apparent velocities $V_{\alpha 1}$ and $V_{\beta 1}$ at $S_1$ and $G_1$ for each of the remaining reflectors are determined in step 144 by means of equations (18) and (19).

At this point, both horizontal and vertical information for the second layer is in the same state as it was in step 132 relative to the first layer. Therefore, steps 132 to 144 of the spatial mapping process can be exercised again to obtain velocity models of the second layer, third layer, and so on. The cumulated velocity models of the various layers provide the information which is needed to migrate the seismic amplitudes of the dually-stacked traces from time to spatial position coordinates of the reflection points for the display of a migrated depth section in step 149.

B. Three Dimensional Data

The processes of multiple stacking and spatial mapping described above assumes that the reflecting boundaries are perpendicular to the vertical plane of the seismic line (i.e., the 'seismic plane'). More generally, energy comes from reflections outside the seismic plane, the information from which is contained in three-dimensional seismic data. The third dimension is measured along the W axis which is perpendicular to the Y and Z axes. The positive direction of the W axis is defined by a right handed system; when a right hand curls from the positive Y to the positive Z axis, the thumb points in the direction of the positive W axis.

Figure 7B:
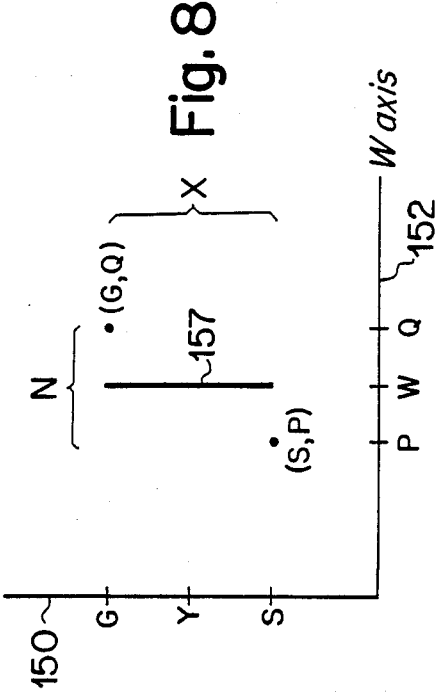
FIGS. 7A, 7B and 7C are plan views of a reference seismic line and source-receiver pairs on the surface illustrating different traces relative to a reference trace that may be stacked according to the present invention.
Figure 7A:
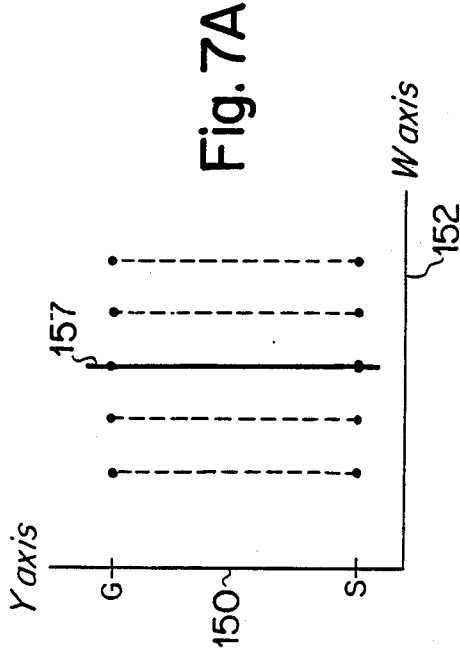

Three-dimensional data may be acquired from independent parallel seismic lines, as shown in FIG. 7A. In this figure, the Y and W axes at the surface are denoted by lines 150 and 152, respectively. A reference seismic line 157, parallel to the Y axis, contains a reference trace denoted by source S and receiver G. In addition to the reference seismic line 157, parallel seismic lines are represented by source S—receiver G pairs connected by dotted lines. Traces from these seismic lines can be stacked independently as in steps 110–124 of FIG. 6A. The dually-stacked traces of step 124 from adjacent, parallel seismic lines are then gathered together in step 304 according to common midpoint position and offset distance, and formed into common midpoint-offset (CMO) panels.

The trace amplitudes of a CMO panel are stacked in step 306 according to the linear equation $$T_x = T_{xo} + (W - W_o)/V_\gamma \quad (20)$$

where parameter $T_{xo}$ is the travel time corresponding to the reference trace at position $W = W_o$, and parameter $V_\gamma$ is the apparent velocity of the CMO panel.

The interval velocity $V_1$ of the first layer is determined by inputting the values of $\delta_o$, $\xi_o$, $X_o$, $T_{xo}$, $V_{\alpha o}$ and $V_{\beta o}$ into equation (11) or (12). Angles $\alpha_o$ and $\beta_o$ are determined by equations (13) and (14). The strike angle $\gamma_o$ of the first reflecting boundary is calculated by the equation $$\sin \gamma_o = \frac{V_1}{V_{\gamma o}} \left( \frac{1}{\sin \alpha_o + \sin \beta_o} \right) \quad (21)$$

From angles $\alpha_o$, $\beta_o$ and $\gamma_o$, unit vectors in the direction of the incident and emergent raypaths can be formulated by $$\vec{T}_{go} = \vec{Y}_{go} \cos \beta_o + \vec{W}_{go} \sin \beta_o \sin \gamma_o + \vec{Z}_{go} \sin \beta_o \cos \gamma_o \quad (22)$$

$$\vec{T}_{so} = \vec{Y}_{so} \cos \alpha_o + \vec{W}_{so} \sin \alpha_o \sin \gamma_o + \vec{Z}_{so} \sin \alpha_o \cos \gamma_o \quad (23)$$

where $\vec{T}_{go}$ and $\vec{T}_{so}$ are the unit vectors of the raypath at the receiver and source, respectively. By seismic ray tracing, the reflection point $R_1$ is determined as the intersection of $\vec{T}_{go}$ and $\vec{T}_{so}$. The strike of the reflector at $R_1$ is equal to $\gamma_o$, and the dip of the reflector in the plane determined by $\vec{T}_{so}$ and $\vec{T}_{go}$ is defined by equation (15).

Consider the analysis of the $I^{th}$ layer and reflector after calculating all shallower subsurface characteristics. Angles $\alpha_o$, $\beta_o$ and $\gamma_o$ at the surface, corresponding to the $I^{th}$ reflection event, are calculated from equations (13), (14) and (21) using the interval velocity $V_1$ of the first layer and the apparent velocities $V_{\alpha o}$, $V_{\beta o}$, and $V_{\gamma o}$ of the I-$1^{th}$ reflector. From angles $\alpha_o$, $\beta_o$ and $\gamma_o$, incident and emergent raypaths are constructed using equations (22) and (23), and these raypaths are traced to the I-$1^{th}$ boundary. At points $S_{I-1}$ and $G_{I-1}$, apparent velocities $V_{\alpha I-1}$ and $V_{\beta I-1}$ are calculated by equations (18) and (19).

From knowledge of surface angles $\xi_{I-1}$, $\delta_{I-1}$, and $\theta_{I-1}$, apparent velocities $V_{\alpha I-1}$ and $V_{\beta I-1}$, the remaining travel time in the $I^{th}$ layer, and the offset distance between $S_{I-1}$ and $G_{I-1}$, the interval velocity $V_I$ of the $I^{th}$ layer may be determined using equations (11) or (12). Angles $\alpha_{I-1}$ and $\beta_{I-1}$ are next determined from $$\alpha_{I-1} = \arccos(V_I / V_{\alpha I-1}) \quad (13a)$$

$$\beta_{I-1} = \arccos(V_I / V_{\beta I-1}) \quad (14a)$$

where $V_I$ is the interval velocity in the $I^{th}$ layer. Then, $V_{\gamma I-1}$ can be determined by $$V_{\gamma I-1} = V_{I-1} \sin \epsilon_{sI-1} / \cos \mu_{sI-1} = V_{I-1} \sin \epsilon_{sI-1} / \{\vec{T}_{sI-2} * \vec{W}_{sI-1}\} \quad (24)$$

or $$V_{\gamma I-1} = V_{I-1} \sin \epsilon_{gI-1} / \cos \mu_{gI-1} = V_{I-1} \sin \epsilon_{gI-1} / \{\vec{T}_{gI-2} * \vec{W}_{gI-1}\} \quad (25)$$

where $\mu_{sI-1}$ and $\mu_{gI-1}$ denote the angles between $\vec{W}_{sI-1}$ and $\vec{T}_{sI-1}$, and $\vec{W}_{gI-1}$ and $\vec{T}_{gI-1}$, respectively (see equations (18) and (19) for a description of raypath angles $\epsilon$). Use of either of the equations above should give rise to the same apparent velocity since in the ultimate layer, both incident and emergent raypaths must lie in a single plane.

Finally, the strike angle $\gamma_I$ is calculated from $$\sin \gamma_I = \frac{V_I}{V_{\gamma I-1}} \frac{1}{\{\sin \epsilon_{sI-1} + \sin \epsilon_{gI-1}\}} \quad (26)$$

Apparent velocities $V_{\alpha I-1}$, $V_{\beta I-1}$, and $V_{\gamma I-1}$ and their respective angles are all measured relative to the vector systems at $S_{I-1}$ and $G_{I-1}$.

The flow of information in spatial mapping of three-dimensional data acquired from independent parallel seismic lines is presented in FIG. 6B. Horizontal and vertical information is assembled in step 132. Then, in step 134, the first layer interval velocities $V_1$ are determined through equations (11) and (12). In steps 136 and 310, angles $\alpha_o$, $\beta_o$ and $\gamma_o$ are determined through equations (13), (14) and (21), respectively. Then, raypath vectors $\vec{T}_{so}$ and $\vec{T}_{go}$ are constructed using equations (22) and (23), and their intersections are used to locate reflection point $R_1$. Finally, dip angle $\theta_1$ is determined through equation (15).

The $V_{\alpha o}(T_{xo})$, $V_{\beta o}(T_{xo})$ and $V_{\gamma o}(T_{xo})$ information is assembled for the remaining reflectors in stes 138 and 312. The first layer incident and emergent raypath vectors $T_{so}$ and $T_{go}$ are then generated in step 140 for the remaining reflectors with equations (13), (14), (21), (22) and (23). By raypath tracing from $S_o$ and $G_o$, the horizontal information of $X_1$, $S_1$, $G_1$, $\delta_1$ and $\xi_1$ at the first reflecting boundary can be calculated for each of the remaining reflectors.

The travel times from $S_o$ to $S_1$ and $G_o$ to $G_1$ are now computed in step 142, and then subtracted from $T_{xo}$. This gives the travel times $T_{x1}$ that are required in going from $S_1$ and $G_1$ on the first reflector to the reflection points on each of the remaining reflectors. The apparent velocities $V_{\alpha 1}$, $V_{\beta 1}$ and $V_{\gamma 1}$ at $S_1$ and $G_1$ for each of the remaining reflectors are determined in steps 144 and 314 by means of equations (18), (19), (24) and (25).

At this point, both horizontal and vertical information for the second layer is in the same state as it was in step 132 relative to the first layer. Therefore, the steps from 132 to 144 and from 310 to 314 of the spatial mapping process can be exercised again to obtain velocity models of the second layer, third layer, and so on.

The accuracy of parallel line stacking and spatial mapping partly depends on the assumption that the incident and emergent raypaths will have the same lateral angle $\gamma_o$ at the surface. When three-dimensional seismic data are collected in the form of intersecting seismic lines, the processes of multiple stacking and spatial mapping allow for the determination of different lateral angles at the source and receiver.

In order to obtain different lateral angles at the source and receiver, two stacking steps that use data acquired from outside of the reference seismic line must be performed. Such data are illustrated in FIGS. 7A, B and C.

Figure 7C:
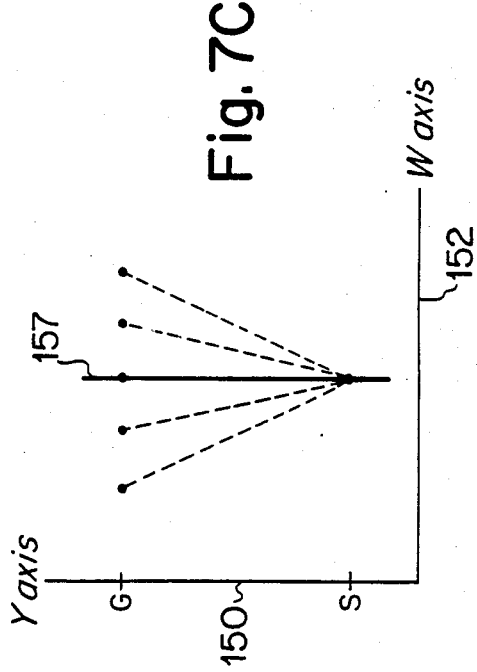

In one collection method, data are acquired both from independent parallel lines, illustrated in FIG. 7A, as well as from sources and receivers displaced on opposite sides of the reference seismic line, as shown in FIG. 7B. In a second method, data are acquired where the source (or receiver) is on the reference seismic line, and the receivers (or sources) are outside of the seismic line, as shown in FIG. 7C. As described below, in order to obtain the lateral dip angles of incident and emergent raypaths, data collected by the first method are stacked in a method of the present invention termed crosscut I stacking, and data collected by the second method are stacked in a method of the present invention termed crosscut II stacking.

Figure 8:
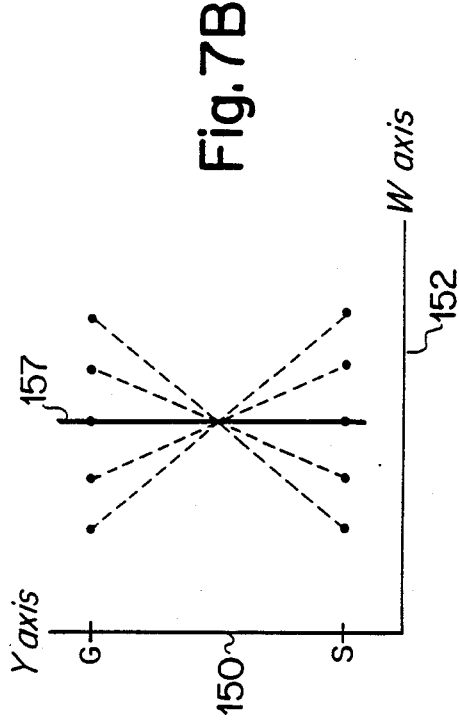
FIG. 8 is a plan view of the position of a source-receiver pair on the surface illustrating coordinate systems used to describe source-receiver pairs according to the present invention.

Source and receiver locations in the Y-W plane may be defined by two sets of orthogonal coordinates, as shown in FIG. 8. In this figure, the Y and W axes at the surface are represented by lines 150 and 152, respectively. The reference seismic line 157 is parallel to the Y axis, and intersects the W axis at $W_o$.

In the first orthogonal coordinate system of the Y-W plane, the location of a source-receiver pair is defined by the coordinates (S,P,G,Q) where S and G are the positions of the source and receiver in the Y direction, respectively, and P and Q are the positions of the source and receiver in the W direction.

In a second orthogonal coordinate system of the Y-W plane, the location of a source-receiver pair is defined by the coordinates (X,Y,N,W) where $$X = S - G \tag{27}$$

$$Y = (S + G)/2 \tag{28}$$

$$N = P - Q \tag{29}$$

$$W = (P + Q)/2 \tag{30}$$

Thus, X is the offset between source and receiver measured along the Y axis, Y is the midpoint along the Y axis, N is the offset measured along the W axis, and W is the midpoint measured along the W axis.

For traces conforming to FIGS. 7A and 7B, the first two steps of crosscut I stacking are performed along the reference seismic line, as in steps steps 100–124 of FIG. 6A, in order to obtain $V_{\alpha o}$ and $V_{\beta o}$ as functions of $T_{xo}$. The next step of crosscut I stacking allows W to vary while X, Y, and N are fixed. This step corresponds to CMO stacking for independent parallel seismic lines, and it yields $V_{\gamma o}$ as a function of $T_{xo}$.

In the last step of crosscut I stacking, N is varied, while X, Y, and W are fixed. Traces that can be thus stacked are shown in FIG. 7B. In this case, the moveout curve is approximated by the three parameter hyperbola $$T_x^2 = T_{No}^2 + (N - N_o)^2 / V_s^2 \tag{31}$$

with unknowns $N_o$, travel time $T_{No}$ at value $N_o$, and stacking velocity $V_s$. The values of these unknowns may be determined using a suggestion in U.S. Pat. No. 3,696,331. For each $T_{No}$ a number of trial values for $N_o$ are tested for each value of $V_s$. The combination of $N_o$ and $V_s$ is chosen that yields the highest similarity coefficient at each $T_{No}$. The slope of the moveout hyperbola, and therefore the apparent velocity $V_{no}$, is given by $$V_{no} = -V_s^2 \, T_{No}/N_o \tag{32}$$

From the values of $V_{\gamma o}$ and $V_{no}$, the apparent velocities of the P and Q moveouts may be obtained. The P moveout represents the W displacement of the source when the receiver is fixed; and the Q moveout represents the W displacement of the receiver when the source is fixed. The transformations are performed according to $$\frac{1}{V_P} = \frac{1}{V_n} + \frac{1}{2V_\gamma} \tag{33}$$

$$\frac{1}{V_Q} = -\frac{1}{V_n} + \frac{1}{2V_\gamma} \tag{34}$$

completing crosscut I stacking.

For traces conforming to FIG. 7C and the converse case where receiver G is fixed and source S varies, the first two steps of crosscut II stacking are performed along the reference seismic line, as in steps 100–124 of FIG. 6A. This yields $V_{\alpha o}$ and $V_{\beta o}$ as functions of $T_{xo}$. Traces that may be stacked to directly measure $V_Q$ are shown in FIG. 7C. In the Q moveout, trace amplitudes may be fit to the hyperbolic moveout curve $$T_x^2 = T_{Qo}^2 + (Q - Q_o)^2 / V_s^2 \tag{35}$$

The unknowns $T_{Qo}$, $Q_o$ and $V_s$ would be determined similarly to $T_{No}$, $N_o$ and $V_s$ as described above for the N moveout curve. Similarly, in a P moveout, trace amplitudes may be fit to the hyperbolic moveout curve $$T_x^2 = T_{po}^2 + (P-P_o)^2/V_s^2 \quad (36)$$

From the fitted unknowns, the apparent velocities would be calculated by $$V_{Po} = -V_s^2 T_{Po}/P_o \quad (37)$$

$$V_{Qo} = -V_s^2 T_{Qo}/Q_o \quad (38)$$

completing crosscut II stacking.

The two methods of determining $V_P$ and $V_Q$ comprise distinct methods of crosscut stacking. As shown in FIG. 6A, crosscut stacking I involves all of the normal processes of parallel line stacking included in steps 110–124, 304 and 306. In addition, common W traces are accumulated in step 300, from which the W apparent velocity, $V_n$, is measured as a function of $T_{xo}$ in step 302. Next, the $V_P$ and $V_Q$ apparent velocities are determined as a function of $T_{xo}$ from $V_n$ and $V_\gamma$ using equations (33) and (34).

Starting with seismic observations acquired by different geometries, both crosscut stacking I and crosscut stacking II yield dual stacked traces from step 124 as well as $V_P$ and $V_Q$ as functions of $T_{xo}$. It is understood that for determining different lateral raypath angles at the source and receiver through use of $V_P$ and $V_Q$ measurements, methods of data collection and stacking other than the crosscut I and II processes described may be performed, provided that the orthogonal coordinate systems used can be resolved into P and Q components. Because of the generality of the P and Q coordinates, this should include almost any two dimensional array of sources and receivers on the surface. These and similar methods are construed as being within the scope of this invention. Spatial mapping now proceeds identically from any scheme giving $V_P$ and $V_Q$ information.

The interval velocity $V_1$ of the first layer is determined by inputting the values of $\delta_o, \xi_o, X_o, T_{xo}, V_{\alpha o}$ and $V_{\beta o}$ into equation (11) or (12). Incident and emergent raypath lateral angles $\sigma_o$ and $\omega_o$ are the angles formed by seismic raypaths at the source and receiver, relative to the planes defined by $\bar{Y}_{so}$ and $\bar{Z}_{so}$, and $\bar{Y}_{go}$ and $\bar{Z}_{go}$, respectively. Apparent velocities $V_{Po}$ and $V_{Qo}$ at the surface are related to $\sigma_o$ and $\omega_o$ by equations $$\sin \sigma_o = \frac{V_1}{V_{Po}} \cdot \frac{1}{\sin \alpha_o} \quad (39)$$

$$\sin \omega_o = \frac{V_1}{V_{Qo}} \cdot \frac{1}{\sin \beta_o} \quad (40)$$

Given $\alpha_o, \beta_o, \sigma_o$ and $\omega_o$, unit vectors along the incident and emergent raypaths can be constructed according to the following equations.

$$\bar{T}_{go} = \bar{Y}_{go} \cos \beta_o + \bar{W}_{go} \sin \beta_o \sin \omega_o + \bar{Z}_{go} \sin \beta_o \cos \omega_o \quad (41)$$

$$\bar{T}_{so} = \bar{Y}_{so} \cos \alpha_o + \bar{W}_{so} \sin \alpha_o \sin \sigma_o + \bar{Z}_{so} \sin \alpha_o \cos \sigma_o \quad (42)$$

By seismic ray tracing, the reflection point $R_1$ is determined as the intersection of $\bar{T}_{go}$ and $\bar{T}_{so}$. The strike of the reflector at $R_1$ is equal to either $\sigma_o$ or $\omega_o$ (they should be equal in the case of the first reflector), and the dip of the reflector in the plane determined by $\bar{T}_{so}$ and $\bar{T}_{go}$ is defined by equation (15).

For data related to the $I^{th}$ boundary, raypath vectors $\bar{T}_{so}$ and $\bar{T}_{go}$ are formed as above, and ray tracing by standard means may be performed, resulting in the spatial mapping of offset and travel time information to the I-$1^{th}$ boundary. Spatial mapping of $V_\alpha$ and $V_\beta$ is performed identically as described for parallel line stacking and spatial mapping. Spatial mapping of $V_P$ and $V_Q$ is governed by equations $$V_{PI-1} = V_{I-1} \sin \epsilon_{sI-1}/\cos \mu_{sI-1} = V_{I-1} \sin \epsilon_{sI-1}/\{\bar{T}_{sI-2} * \bar{W}_{sI-1}\} \quad (43)$$

$$V_{QI-1} = V_{I-1} \sin \epsilon_{gI-1}/\cos \mu_{gI-1} = V_{I-1} \sin \epsilon_{gI-1}/\{\bar{T}_{gI-2} * \bar{W}_{gI-1}\} \quad (44)$$

Solution of the $I^{th}$ layer and boundary characteristics is carried out as described for parallel line spatial mapping.

The flow of information in spatial mapping of the output of crosscut stacking I and II is presented in FIG. 6B. Horizontal and vertical information is assembled in step 132. Then, in step 134, the first layer interval velocities $V_1$ are determined through equations (11) or (12). In steps 136 and 310, angles $\alpha_o, \beta_o$ and $\gamma_o$ are determined through equations (13), (14) and (21), respectively. Then, raypath vectors $\bar{T}_{so}$ and $\bar{T}_{go}$ are constructed using equations (22) and (23), and their intersections are used to locate reflection point $R_1$. Finally, dip angle $\theta_1$ is determined through equation (15).

The $V_{\alpha o}(T_{xo})$, $V_{\beta o}(T_{xo})$, $V_{Po}(T_{xo})$ and $V_{Qo}(T_{xo})$ information is assembled for the remaining reflectors in steps 138 and 312. The first layer incident and emergent raypath vectors $\bar{T}_{so}$ and $\bar{T}_{go}$ are then generated in step 140 for the remaining reflectors with equations (13), (14), (39), (40), (41) and (42). By raypath tracing from $S_o$ and $G_o$, the horizontal information of $X_1, S_1, G_1, \delta_1$ and $\xi_1$ at the first reflecting boundary can be calculated for each of the remaining reflectors.

The travel times from $S_o$ to $S_1$ and $G_o$ to $G_1$ are now computed in step 142, and then subtracted from $T_{xo}$. This gives the travel times $T_{x1}$ that are required in going from $S_1$ and $G_1$ on the first reflector to the reflection points on each of the remaining reflectors. The apparent velocities $V_{\alpha 1}, V_{\beta 1}, V_{P1}$ and $V_{Q1}$ at $S_1$ and $G_1$ for each of the remaining reflectors are determined in steps 144 and 314 by means of equations (18), (19), (43) and (44).

At this point, both horizontal and vertical information for the second layer is in the same state as it was in step 132 relative to the first layer. Therefore, the steps from 132 to 144 and from 310 to 314 of the spatial mapping process can be exercised again to obtain velocity models of the second layer, third layer, and so on.

The special vector systems $\bar{Y}, \bar{W}$ and $\bar{Z}$ as defined at each $S_i$ and $G_i$ are not necessary components of three dimensional spatial mapping. Alternatively, a single vector system defined at the surface or a changing vector system defined with respect to the seismic wavefront are also possible.

It is evident that equations (2), (4), (20), (31), (35), and (36) provide approximations of the slopes of the moveout curves in the corresponding panels of traces, and different or higher order approximations could have been used as well, without departing from the teachings of the present invention. These equations and any other approximations to the slopes of the moveout equations are to be construed as within the scope of this invention.

It is understood, based on the principle of reciprocity, that where in the foregoing disclosure reference is made to a source and receiver, the converse may be used and the words source and receiver may be interchanged.

While certain embodiments of the invention have been shown and described, various modifications may be made without departing from the spirit of the invention. The appended claims are intended to cover the invention described above.

We claim:

1. A method of representing the locations, shapes, and interval velocities between reflecting boundaries of the earth's layers as a section of the earth from data obtained in response to seismic waves imparted during a seismic survey, comprising the steps of:
   (a) collecting seismic data during said survey from a plurality of seismic energy sources and receivers;
   (b) sorting said collected data into a plurality of gathers of seismic traces, each said gather comprising seismic traces with a common source or receiver or midpoint location;
   (c) subsetting each said gather into a plurality of bundles of seismic traces, each said bundle spanning a different range of seismic trace offsets and comprising a plurality of seismic traces;
   (d) stacking said seismic traces in each said bundle to obtain first apparent velocity functions as a function of travel times at an average offset of said seismic traces in each said bundle;
   (e) further stacking said stacked traces corresponding to common average offset ones of said bundles from successive groups of said gathers to obtain second apparent velocity functions as a function of travel times at said average offset in at least one additional orthogonal coordinate for said stacked trace at the midpoint of each said successive group of gathers;
   (f) determining interval velocities of the earth's layers and the locations and shapes of the earth's reflecting boundaries from said first and second functions and said average offset; and
   (g) representing said determined interval velocities, said locations, and said shapes.

2. The method of claim 1, wherein said step of collecting comprises the step of:
   collecting seismic data from a plurality of seismic energy sources and receivers arranged in a linear array.

3. The method of claim 2, wherein said step of collecting further includes the step of:
   collecting seismic data from a plurality of seismic energy sources and receivers arranged in parallel linear arrays where the energy imparted from an energy source is detected by a receiver in the same line.

4. The method of claim 3, wherein said step of collecting further includes the step of:
   collecting seismic data from a plurality of seismic energy sources and receivers arranged in parallel linear arrays where the energy imparted from an energy source is detected by a receiver in a different line.

5. The method of claim 2, wherein said step of collecting further includes the step of:
   collecting seismic data from a plurality of seismic energy sources and receivers arranged in intersecting linear arrays where the energy imparted from an energy source is detected by a receiver in a different line.

6. The method of claim 1, wherein said step of sorting includes the step of:
   sorting said collected data into said plurality of gathers, where each said gather comprises seismic traces with a common midpoint between its source and receiver locations.

7. The method of claim 1, wherein said step of subsetting includes the step of:
   subsetting common midpoint gathers into said plurality of bundles of seismic traces, each bundle of one of said common midpoint gathers having the same average offset as a bundle of any other one of said common midpoint gathers.

8. The method of claim 1, wherein said step of stacking includes the step of:
   stacking the seismic traces in a common midpoint bundle of one of said common midpoint gathers to obtain said first functions as a function of travel times at the said same average offset of the seismic traces in said bundle of said one of said common midpoint gathers.

9. The method of claim 8, wherein said step of further stacking includes the step of:
   further stacking said stacked traces of said common midpoint bundles corresponding to common average offset ones of said bundles from successive groups of common midpoint gathers to form common midpoint-offset bundles and to obtain said second functions as a function of travel times at the said same average offset in offset distance coordinates for the said stacked trace at the midpoint of each said successive group of common midpoint gathers.

10. The method of claim 9, wherein said step of further stacking includes the step of:
    further stacking said stacked traces of said common midpoint-offset bundles from successive groups of gathers to obtain apparent velocities as a function of travel times in corresponding orthogonal coordinates for the multiply-stacked trace at the midpoint of each successive group of gathers.

11. The method of claim 1, wherein said step of determining said interval velocities, said locations and said shapes comprises the steps of:
    (a) determining the interval velocity of first subsurface layer using apparent velocities, offsets, travel times, and surface parameters;
    (b) determining first boundary surface parameters comprised of the location and shape of the first reflecting boundary from said determined interval velocity of said first layer;
    (c) determining the directions at the surface of the incident and emergent seismic raypaths to deeper boundaries;
    (d) tracing the seismic raypaths from said surface to said first boundary;
    (e) determining first boundary apparent velocities of each of said raypath at said first boundary;
    (f) determining the interval velocity of the second subsurface layer using said first boundary apparent velocities, offsets, travel times, and said first boundary surface parameters;
    (g) determining second boundary surface parameters comprised of the location and shape of the second reflecting boundary from said determined interval velocity of said second layer; and
    (h) repeating (c) through (g) to determine the interval velocity, location and shape of succeedingly deeper layers and boundaries.

* * * * *